(12) United States Patent
Ricard

(10) Patent No.: US 7,044,507 B2
(45) Date of Patent: May 16, 2006

(54) ASSEMBLY SYSTEM FOR TWO TUBULAR PARTS CAPABLE OF BEING LOCKED AND UNLOCKED

(75) Inventor: Joël Ricard, Pessac (FR)

(73) Assignee: Commissariat a l'Energie Atomique, Paris (FR)

( * ) Notice: Subject to any disclaimer, the term of this patent is extended or adjusted under 35 U.S.C. 154(b) by 117 days.

(21) Appl. No.: 10/332,295

(22) PCT Filed: Jul. 5, 2001

(86) PCT No.: PCT/FR01/02156

§ 371 (c)(1), (2), (4) Date: Jan. 6, 2003

(87) PCT Pub. No.: WO02/02982

PCT Pub. Date: Jan. 10, 2002

(65) Prior Publication Data

US 2003/0184091 A1    Oct. 2, 2003

(30) Foreign Application Priority Data

Jul. 6, 2000    (FR) .................................. 00 08799

(51) Int. Cl.
*F16L 25/00*    (2006.01)
(52) U.S. Cl. .................... 285/330; 285/913; 285/86
(58) Field of Classification Search .............. 285/66, 285/86, 90, 309, 310, 314, 315, 333, 358, 285/362, 377, 401, 913, 394, 330, 291.1, 285/328, 148.5
See application file for complete search history.

(56) References Cited

U.S. PATENT DOCUMENTS

| | | | | |
|---|---|---|---|---|
| 179,815 A | * | 7/1876 | O'Neill | 285/913 |
| 406,397 A | * | 7/1889 | Hampton | 285/66 |
| 2,439,161 A | * | 4/1948 | Du Bois | 285/913 |
| 3,637,238 A | * | 1/1972 | Grosch | 285/330 |
| 4,878,695 A | | 11/1989 | Whitham | |
| 5,288,114 A | | 2/1994 | Crane et al. | |

FOREIGN PATENT DOCUMENTS

| | | | | |
|---|---|---|---|---|
| CA | 475813 | * | 8/1951 | 285/913 |
| EP | 0 770 809 A1 | | 5/1997 | |
| FR | 1039785 | * | 10/1953 | 285/330 |
| FR | 1538477 | | 9/1968 | |
| SU | 773374 | * | 10/1980 | 285/330 |

* cited by examiner

*Primary Examiner*—Aaron Dunwoody
(74) *Attorney, Agent, or Firm*—Thelen Reid & Priest LLP

(57) ABSTRACT

The system permits two tubular parts (1, 2) to be assembled, the assembly being able to be locked or released, without a cumbersome device being required. It includes in particular a toothed crown (10, 20) on each of the two tubular parts (1, 2), each with a series of teeth (11, 21) disposing of straight radial shoulders (12) on the first toothed crown and angled shoulders (22) on the second toothed crown. This assembly is completed by a locking ring (30) disposing of teeth (31) designed to fit between the shoulders (12, 22) of the two crowns, once they have interlocked. Turning the locking ring (30) allows, using the angled locking faces (33) of the teeth (31), the two tubular parts (1, 2) to be locked together. A locating ring (40) may be used to center the parts and receive the shear loads due to a transversal mechanical change. The system may be applied for large tubular part assemblies that need to be dismantled.

4 Claims, 4 Drawing Sheets

ASSEMBLY SYSTEM FOR TWO TUBULAR PARTS CAPABLE OF BEING LOCKED AND UNLOCKED

Figure 1:
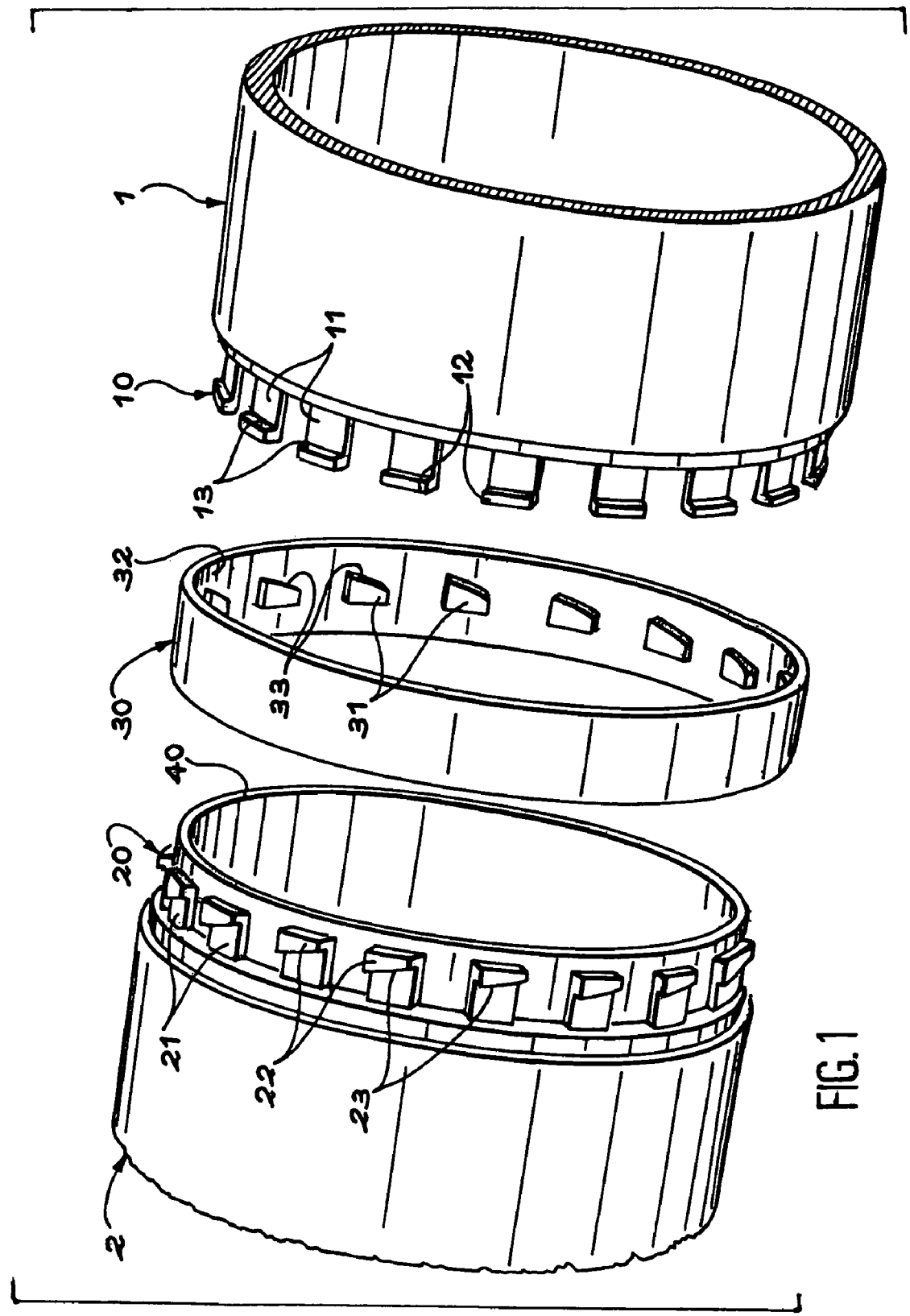

This application claims priority based on International Patent Application No. PCT/FR01/02156, entitled "Lockable and Releasable Assembly System For Two Tubular Parts" by Joel Ricard, which claims priority of French Patent Application Serial No. 00 08799, filed on Jul. 6, 2000.

FIELD OF THE INVENTION

The invention concerns, in general, end to end assembly of two tubular parts and, in particular, large diameter pipes.

PRIOR ART AND THE PROBLEM IN QUESTION

In industry, there are several conventional and efficient means for end-to-end assembly of two tubular parts, including the following three examples.

A first means consists of fitting a flange to the end of each of the two pipes. The two pips are joined by means of a screw thread, such as locking studs or bolts. This system is widely used and is particularly sturdy, and does not require any difficult machining. However, it is time consuming to implement and is cumbersome.

A second means consists of using the same flanges mentioned in the previous paragraph, but to join them together by means of an external collar. This system is also sturdy, but also requires a considerable amount of time. In addition, the machined dimensions of the collar depend on the dimensions of the flanges and need to be accurate. Finally, it is quite cumbersome.

A third system consists of a threaded connection, which is to say screwing each end of the pipes to be connected into a same sleeve. This system is also sturdy and takes up little space. It does not require any difficult machining or a lot of time. However, it is more difficult to dismantle.

The aim of the invention is therefore to overcome these drawbacks by offering a compact system, that is sturdy and easy to implement and that does not require precision machining.

SUMMARY OF THE INVENTION

To this end, the main subject of the invention is a lockable and releasable end to end assembly system for two tubular parts of the same diameter, the system comprising:

a first toothed crown, attached to one end of the first of the two tubular parts to be assembled, and formed by a determined number N of teeth, the ends of which each have a straight radial shoulder facing towards the outside;

a second toothed crown, attached to the end of the second of the two tubular parts to be assembled, and formed of the same determined number N of teeth, the ends of which each having an angled radial shoulder, with an angled clamping face forming a helicoidal ramp section stretching towards the outside, these teeth being separated from one another by a space at least as large as the teeth of the first crown, the teeth of the first crown being separated from one another by a space at least as large as the width of each tooth of the second crown; and a locking ring formed by a section of tube whose internal diameter is slightly bigger than the diameter defined by the radial shoulders of the teeth of the two toothed crowns, this locking ring having the same number N of trapezoidal teeth and each having an angled clamping face forming a helicoidal ramp section that is complementary to that of the angled shoulders of the second toothed crown, which is to say with the same angle as that of the angled clamping faces of the shoulders of the teeth of the second toothed crown, the teeth of this ring being narrower than the space between the teeth of the second crown and being positioned at a distance equal to or greater than the width of the teeth of the two toothed crowns, in order that they can fit between and over the two toothed crowns and to penetrate, by rotation around the axis of the toothed crowns, the teeth its teeth between the respective shoulders of the teeth of the two toothed crowns until the assembly is locked.

In the principal embodiment of the invention, the ring's teeth each have a flexible attachment to the locking ring to leave a degree of freedom to the angled clamping faces of the teeth rotating around the axis of the toothed crowns.

In this case, it is preferable that these teeth are each formed by an individual part separate from the locking ring, the flexible attachment being formed by a narrower section of the tooth between the angled clamping face and a thrust face of the same tooth, which takes, by means of a thrust pad, the thrust of the locking ring and thus defining the an element of flexibility on which the thrust face and tooth body are situated.

At least one slot in the tooth body may complete this embodiment to fasten the tooth to the locking ring, by means of a guide pin fixed to the locking ring, in order to guide the relative sliding movement of the tooth with respect to the locking ring.

In the same case, it is also useful to use an releasing stop, fixed to the locking ring, which bears on a face opposite the thrust face of the corresponding tooth, in order to release the assembly by rotation of the locking ring, in the opposite direction to that used to lock it.

In order to make the two parts to be assembled easier to position, it is useful to use a centring ring whose external diameter is just smaller than the internal diameter of the toothed crowns, and which is to be placed inside of the toothed crowns. Furthermore, this ring receives the shear loads in the event of transversal mechanical loads being applied.

It is possible to use at least one locking screw that passes through the centring ring, the two toothed crowns and the locking ring to lock the whole assembly together.

LIST OF FIGURES

Figure 2:
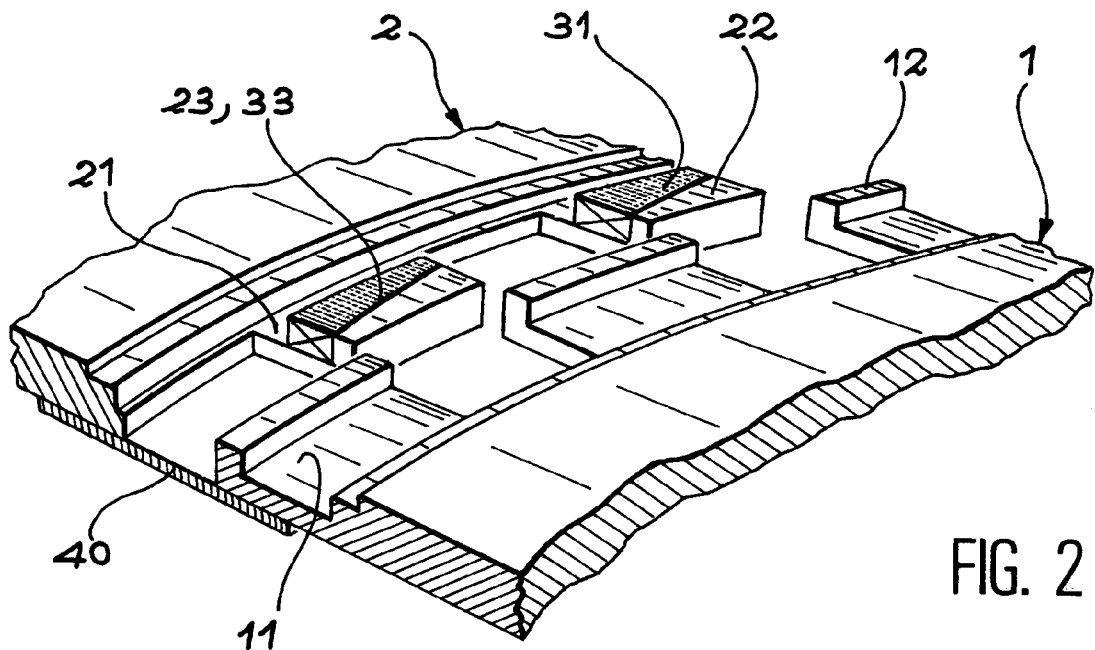
Figure 3:
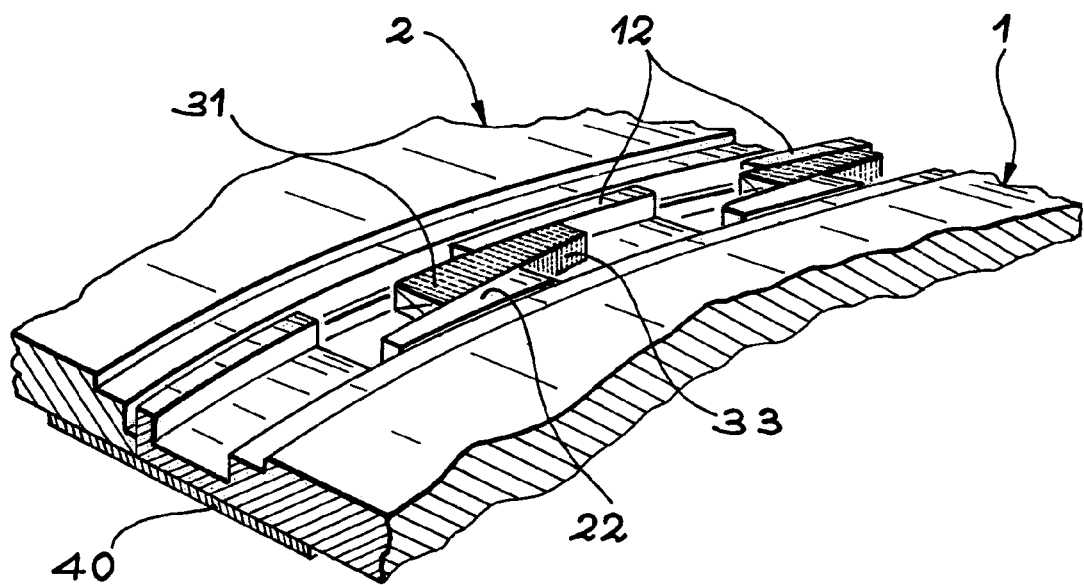
Figure 4:
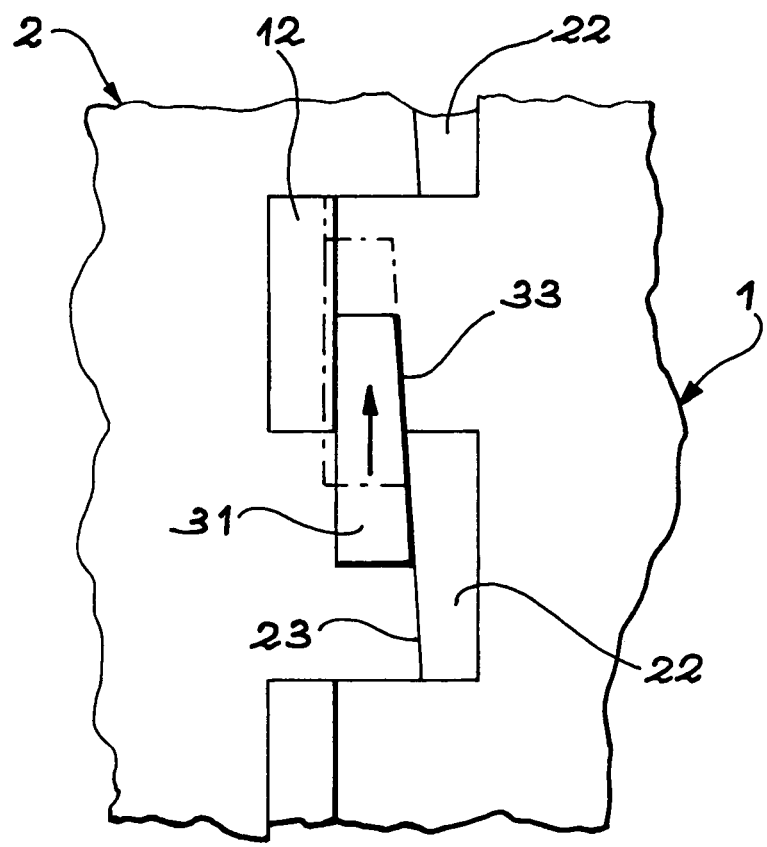
Figure 6:
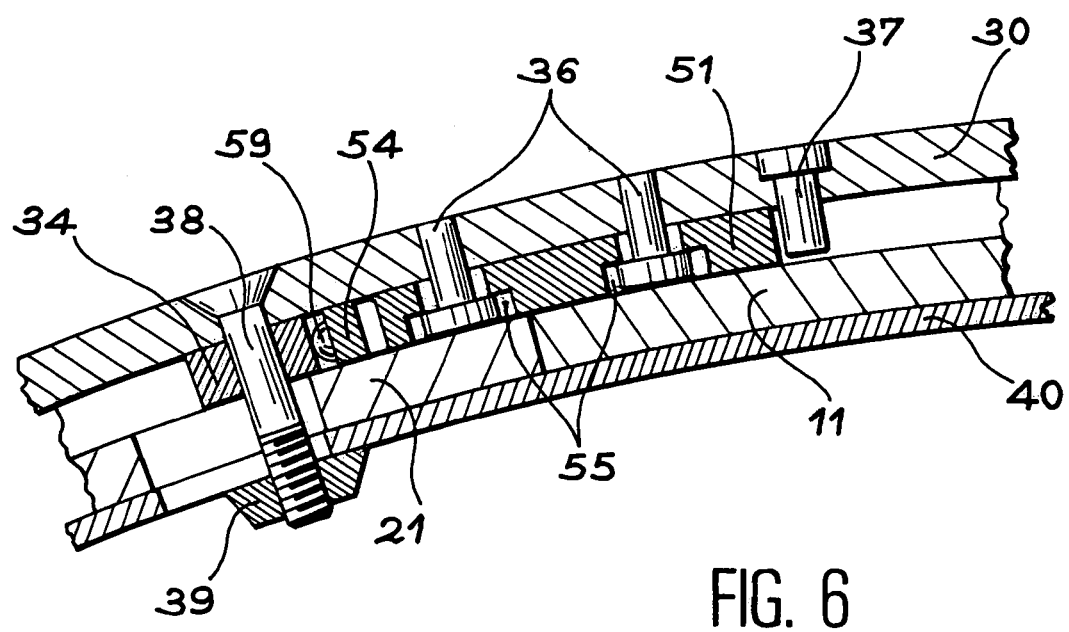
Figure 5:
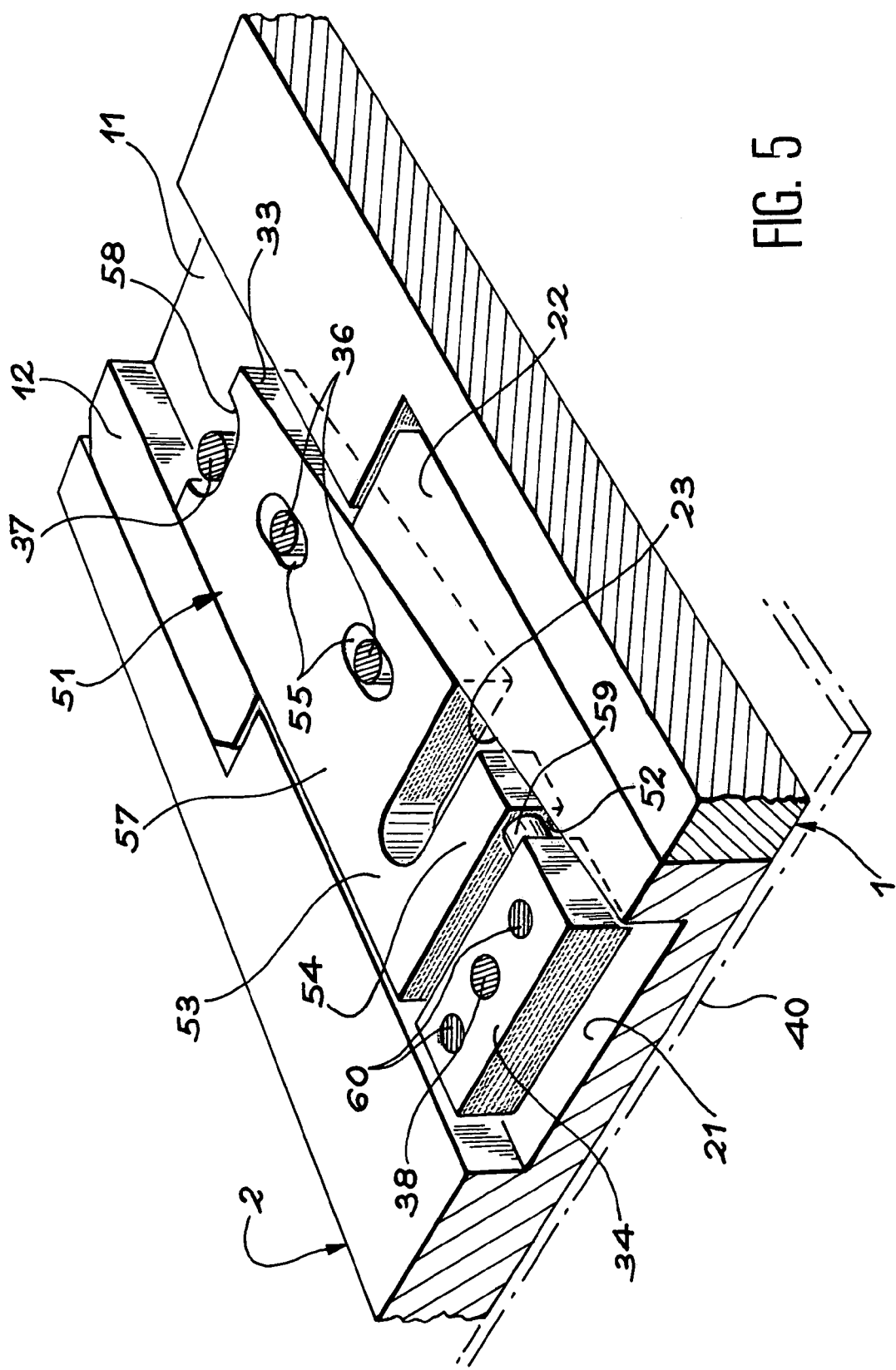

The invention and its various technical characteristics will be easier to understand after reading the following description, accompanied by several figures respectively showing:

FIG. 1, showing an exploded view of the system according to the invention;

FIG. 2, showing in a cutaway view, the main elements of the invention prior to assembly, the locking ring only shown partially;

FIG. 3, showing in a cutaway view, the main elements of the invention after assembly, the locking ring only shown partially;

FIG. 4, a partial view of the teeth used in the system according to the invention;

FIG. 5, showing in a cutaway view, the details of a preferred embodiment of the system according to the invention; and FIG. 6, a partial cross section, showing another detail of the preferred embodiment of the system according to the invention.

DETAILED DESCRIPTION OF AN EMBODIMENT OF THE INVENTION

In reference to FIG. 1, the two tubular parts, 1 and 2, of virtually the same diameter, to be assembled, are each shown fitted with a toothed crown respectively 10 and 20. In this embodiment, these toothed crowns 10 and 20 are an integral part of the two tubular parts 1 and 2. This is only one possible embodiment, these toothed crowns 10 and 20 may be made separately and subsequently fixed to the tubular parts 1 and 2.

These two assemblies are shown separated by a locking ring 30.

The toothed crown 10 of the first tubular part 1 is composed of a determined number N of teeth 11, each disposing of a straight shoulder 12 protruding outwards. Each of these shoulders 12 has a straight clamping face 13 perpendicular to the main axis of the tubular parts 1 and 2 of the crowns and ring, 10, 20 and 30.

Correspondingly, the toothed crown 20 of the second tubular part 2 has a same number N of teeth 21, each disposing of an angled radial shoulder 22 stretching outwards, in the same way as the shoulders 12 of the first toothed crown 10. The only difference is the presence of an angled clamping face 23 thus forming a helicoidal ramp section. It can be remarked that the teeth 11 and 21 of each toothed crown 10 and 20 are separated from one another, which is to say on the same crown, by a distance at least as wide as the width of the teeth themselves 11 and 21. In this way, the toothed crowns 10 and 20 can interlock with one another, the teeth of one fitting between the teeth of the other, the clearance being essentially for assembly purposes.

The third main element of the assembly system is therefore the locking ring 30, composed of a section of tube whose diameter is the same as the external diameter of the two tubular parts 1 and 2 to be assembled, slightly bigger than the diameter defined by the external edges of the shoulders 12 and 22 of the toothed crowns 10 and 20. This locking ring 30 must be capable of covering the two-toothed crowns 10 and 20 when assembled. It disposes, on its inside face 32, of a same determined number N of teeth 31. These teeth are trapezoidal in shape and dispose, among others, of a helicoidal ramp section shaped angled clamping face 33. The angle of this clamping face 33 is the same as that of the clamping face 23 of the shoulders 22 of the second toothed crown 20. They are separated from one another by the same number of spaces, which are at least as wide or slightly wider than the teeth 11 and 21 of the two-toothed crowns 10 and 20. Preferably, the width of the "tooth—space to the next tooth" print of the two-toothed crowns 10 and 20 or of the "tooth—space to the next tooth" print of the locking ring 30 are also equal.

In the representation shown in FIG. 1, a guide 40 is fitted onto the second tubular part 2. This guide is formed of a cylindrical section whose external diameter is the same as the internal diameter of the two tubular parts 1 and 2. It is inserted beforehand into one of the two tubular parts 1 or 2, to make the parts easier to position with respect to one another, and possibly to take the shear loads in the case of the application of a transversal mechanical load.

FIG. 2 illustrates the positioning phase of the two tubular parts 1 and 2, and especially the teeth II and 21 of the two toothed crowns of these tubular parts 1 and 2. Of course, the teeth 11 of the first toothed crown are positioned between the teeth 21 of the second toothed crown, so that they can mesh into one another. The locating ring, 40, positioned inside the second tubular part 2, allows the teeth 11 of the first toothed crown to be positioned so that the assembly can be made.

This same FIG. 2 also shows the teeth 31 of the locking ring, reference 30 on FIG. 1. Each tooth is positioned against a tooth 21 of the second toothed crow, behind the shoulder of the 22 of the corresponding tooth. Consequently, their respective clamping faces 23 and 33 are positioned against one another.

FIG. 3 shows the entire assembly in the assembled and locked position. To this end, the end of each tooth 11 and 21 is chamfered to make the two-toothed crowns 10 and 20 easier to mesh together. The teeth 11 and 21 therefore fit into one another, and the shoulders 12 or 22 of each set of teeth come into contact with the tubular part opposite them.

Furthermore, each tooth 31 undergoes a helicoidal movement between the respective shoulders 12 and 22 of the two-toothed crowns. In other terms, the locking ring has rotated around the axis of the tubular parts 1 and 2.

This movement is shown more clearly in FIG. 4. In fact, the helicoidal movement mentioned is shown by the arrow. The position, shown in dotted lines, is that of the tooth 31 when the assembly is made, which is to say when the parts 1 and 2 are fastened to one another. In this second position, the respective angled clamping faces 23 and 33 of the angled shoulders 22 and the teeth 31 have slid against one another, moving from the smallest end to the largest end of the trapezium shape of the two parts. Consequently, the tooth 31 tends to separate the shoulders 12 and 22 and bring the two tubular parts 1 and 2 together so that they pressed against one another. In other terms, the helicoidal movement of the tooth 31 caused by the rotation of the locking part 30 upon which the teeth 31 are positioned, causes another movement parallel to the axis of the tubular parts 1 and 2, as shown by the small offset between the two positions of the tooth 31 shown in FIG. 4. Of course, the shape and in particular the two heights of the teeth 31 are calculated to optimise clamping.

In order that the attachment uses the maximum number of teeth possible, the machining of the two toothed crowns and the locking ring teeth must be precise and identical so that as many shoulders as possible are in contact. However, as the machining cannot be absolutely perfect, it is supposed that a number of the angled clamping faces will not be in contact with the others, whereas others will be as soon as the locking ring is rotated. One aspect of the invention is therefore to allow all of the teeth to be in, contact with their respective shoulder. To this end, flexible attachments are used between the teeth 31 and the locking ring 30.

FIG. 5 permits a detail of a preferred embodiment of the invention to be shown. The flexible attachment means leave a degree of freedom, in a small proportion, in the direction of the movement of the locking ring teeth, along the teeth 11 and 21, which is to say around the axis of the parts to be assembled 1 and 2. In FIG. 5, and for the purpose of clarity, the locking ring is only shown as one of the N thrust pins 34 that is part of this locking ring. On the other hand, the tooth 51 is mobile with respect to the locking ring. It can simply receive, by means of a thrust face 52 and via a thrust pin 34, the thrust from the locking ring. A thrust pad 59 permits this thrust to be only transmitted to the end of the flexible attachment 54 of the tooth 51, defined by a reduced section 53. The latter therefore defines a flexible part 54 and a tooth body 57.

It can therefore be understood that when the thrust caused by the locking ring thrust pin 34 on the thrust face 52 of the tooth 51, the flexible part 54 can bend slightly under the resistance to the forward movement of the tooth 51, whose clamping face 33 comes into contact with and presses against the clamping face 23 of the corresponding angled shoulder. In this way, the first tooth 51, whose progression will be stopped by friction and the final blocking of the clamping faces 13 and 23, will allow, due to the suppleness of its flexible part 54, the other thrust pins 34 to continue to progress, in the aim of having as many teeth 51 in contact and locked as possible.

FIG. 5 also shows two guide pins 36 that are fixed to the locking ring and with respect to which the tooth 51 can make a translation movement, thanks top two corresponding slots 55. An releasing stop 37, part of the locking ring, is provided to bear onto a face 58 that is opposite the thrust face 52 of the tooth 51. In this way, when the locking ring is rotated, in the opposite direction to that used to lock it, each tooth 51 can be released by the corresponding stop 37.

FIG. 6 shows how the different elements involved in this system are positioned at the tooth 51 level. All of the elements of FIG. 5 can be found in FIG. 6. Each of the guide pins 36 are fixed to the locking ring 30 and are each housed in the corresponding slot 55 of the tooth 51. The thrust pad 59 receives the thrust from the thrust pin 34, which is in turn attached to the locking ring 30 by means of two screws 60. One screw 38 is screwed into a nut 39 which is seated on the centring ring 40, inside the assembly. In this way, the complete clamping of the screw 38 allows the centring ring 40, the teeth 11 and 21 of the toothed crowns, the teeth 51 and the locking ring 30 to be clamped. It is therefore possible to lock the attachment of the two tubular parts 1 and 2 to be joined. It is preferable to provide several clamping screws 38 around the circumference. Such a system may be used to join tubular parts with diameters of 200 mm or more. The number of teeth used and their geometry depends on the loads involved.

It is useful to angle the angled clamping faces 23 and 33 of the angled shoulders 21 and the teeth 31 and 51 at around 4.5°. In fact, the tubular parts to be joined are most often subject to transversal mechanical stresses. The geometry of the system therefore permits the majority of the loads in the longitudinal axis of the parts to be transmitted.

The invention claimed is:

1. A lockable and releasable assembly system for two tubular parts (1, 2) of the same diameter, for end to end assembly, the system comprising:
   a first toothed crown (10), fixed to the end of the first of the two tubular parts (1), and formed by a determined number N of teeth (11), whose ends each have a straight radial shoulder (12), facing outwards;
   a second toothed crown (20), fastened to the end of the second of the two tubular parts (2), formed by the same number N of teeth (21), whose ends each have an angled radial shoulder (22), with an angled clamping face (23), each forming an outward facing helicoidal ramp section, the teeth (21) of this second toothed crown (20) being separated by a distance equal to or greater than the width of the teeth (11) of the first toothed crown (10), the teeth (11) of the first toothed crown (10) each being separated from one another by a distance equal to or greater than the width of the teeth (21) of the second toothed crown (20); and
   a locking ring (30) composed of a tube section whose internal diameter is bigger than the external diameter defined by the shoulders (12, 22) of the two toothed crowns (10, 20), and each having a same determined number N of wedges (31, 51) and an angled clamping face (33) that is complementary to the clamping face (23) of the angled shoulders (22), which is to say at the same angle as the clamping face (23) of the shoulders (22) of the teeth (21) of the second toothed crown (20) and at a distance equal to or greater than the width of the teeth (21) of the second toothed crown (20), so that they can mesh between the toothed crowns (10, 20) and by rotating around the axis of the toothed crowns (10, 20), make the teeth of the locking ring fit between the respective shoulders (12, 22) of the teeth (11, 21) of the two toothed crowns (10, 20) until the assembly is locked,
   wherein the wedges (51) each have a flexible attachment with the locking ring (30) to give a degree of freedom to each clamping face (13, 23) of the wedges (51) rotating around the axis of the toothed crowns, the wedges (51) are each formed by a part separate from the locking ring (30), the flexible attachment being formed by a reduced section (53) of the wedge (51) positioned between the angled clamping face (33) of the wedge (51) and a thrust face (52) of the same wedge (51) that can receive the thrust via a thrust pad (59), a thrust pin (34) actuated by the locking ring (30), thus defining for each wedge (51) a flexible attachment (54) on which the thrust face (52) and a wedge (51) body (57) are located.

2. Assembly system of claim 1, further comprising at least one slot (55) in the body (57) of the wedge (51), that permits a rotational movement of the wedge (51) via a guide pin (36) that is part of the locking ring (30) to guide the wedge (51) in a relative sliding movement with respect to the locking ring (30).

3. Assembly system of claim 1, further comprising a centering ring (40) whose internal diameter is smaller than or equal to the internal diameter of the toothed crowns (10, 20) and which is positioned inside said crowns.

4. Assembly system of claim 1, further comprising at least one release stop (37) that is fastened to the locking ring (30) to bear onto a face (58) that is opposite the thrust face (52) of the wedge (51).

* * * * *